(12) United States Patent
Sartori et al.

(10) Patent No.: US 11,683,788 B2
(45) Date of Patent: Jun. 20, 2023

(54) SYSTEM AND METHOD FOR DATA CHANNEL TRANSMISSION AND RECEPTION

(71) Applicant: Futurewei Technologies, Inc., Plano, TX (US)

(72) Inventors: Philippe Sartori, Plainfield, IL (US); Anthony C. K. Soong, Plano, TX (US); Fredrik Berggren, Kista (SE)

(73) Assignee: Futurewei Technologies, Inc., Plano, TX (US)

( * ) Notice: Subject to any disclaimer, the term of this patent is extended or adjusted under 35 U.S.C. 154(b) by 52 days.

(21) Appl. No.: 15/438,009

(22) Filed: Feb. 21, 2017

(65) Prior Publication Data

US 2017/0164344 A1    Jun. 8, 2017

Related U.S. Application Data

(63) Continuation of application No. 13/651,111, filed on Oct. 12, 2012, now Pat. No. 9,602,255.

(Continued)

(51) Int. Cl.
*H04W 72/044* (2023.01)
*H04L 5/00* (2006.01)
*H04W 72/23* (2023.01)

(52) U.S. Cl.
CPC .......... *H04W 72/044* (2013.01); *H04L 5/003* (2013.01); *H04L 5/0044* (2013.01); *H04L 5/0094* (2013.01); *H04W 72/23* (2023.01)

(58) Field of Classification Search
None
See application file for complete search history.

(56) References Cited

U.S. PATENT DOCUMENTS

2002/0082020 A1* 6/2002 Lee ................... H04W 72/1289
455/450
2008/0298224 A1* 12/2008 Pi ........................... H04L 5/0007
370/204

(Continued)

FOREIGN PATENT DOCUMENTS

CN    101682451 A    3/2010
CN    102026297 A    4/2011
(Continued)

OTHER PUBLICATIONS

LTE, Evolved Universal Terrestrial Radio Access (E-UTRA); Physical layer procedures (3GPP TS 36.213 version 10.2.0 Release 10), Jun. 2011.*

(Continued)

*Primary Examiner* — Alpus Hsu
*Assistant Examiner* — CamQuyen Thai
(74) *Attorney, Agent, or Firm* — Slater Matsil, LLP

(57) ABSTRACT

A method includes allocating, by a communications controller, a first set of resource blocks to an enhanced physical downlink shared channel (ePDSCH), where the ePDSCH has a first starting point and allocating, by the communications controller, a second set of resource blocks to an enhanced physical downlink control channel (ePDCCH). The method also includes identifying, by the communications controller, a second starting point for the ePDSCH, where the second starting point for the ePDSCH is located within a legacy control region, where the first starting point of the ePDCCH is located within the legacy control region, and where the second starting point of the ePDSCH is different than the first starting point of the ePDCCH. Additionally, the method includes signaling, by the communications controller to a user equipment (UE) the second starting (Continued)

point and a number of the second set of resource blocks allocated to the ePDSCH.

21 Claims, 6 Drawing Sheets

Related U.S. Application Data

(60) Provisional application No. 61/546,878, filed on Oct. 13, 2011.

(56) References Cited

U.S. PATENT DOCUMENTS

| | | | |
|---|---|---|---|
| 2009/0175159 A1 | 7/2009 | Bertrand et al. | |
| 2009/0252075 A1 | 10/2009 | Ji et al. | |
| 2009/0257388 A1* | 10/2009 | Khandekar | H04W 16/14 370/329 |
| 2010/0165847 A1* | 7/2010 | Kamuf | H04L 5/0064 370/329 |
| 2010/0232546 A1 | 9/2010 | Yu et al. | |
| 2010/0260081 A1* | 10/2010 | Damnjanovic | H04L 5/0053 455/70 |
| 2011/0044261 A1 | 2/2011 | Cai et al. | |
| 2011/0103330 A1* | 5/2011 | Montojo | H04W 72/0493 370/329 |
| 2011/0110296 A1* | 5/2011 | Malladi | H04B 1/713 370/328 |
| 2011/0141901 A1* | 6/2011 | Luo | H04L 1/1835 370/241 |
| 2011/0165906 A1 | 7/2011 | Papasakellariou et al. | |
| 2011/0170496 A1* | 7/2011 | Fong | H04W 52/244 370/329 |
| 2011/0194527 A1* | 8/2011 | Lin | H04B 7/022 370/330 |
| 2011/0243090 A1* | 10/2011 | Grovlen | H04L 1/18 370/329 |
| 2011/0249633 A1* | 10/2011 | Hong | H04W 72/042 370/329 |
| 2011/0268032 A1* | 11/2011 | Kim | H04L 1/1671 370/328 |
| 2011/0317645 A1* | 12/2011 | Jen | H04L 5/001 370/329 |
| 2012/0033650 A1 | 2/2012 | Ahn et al. | |
| 2012/0178360 A1* | 7/2012 | Park | H04B 7/2606 455/7 |
| 2012/0207099 A1* | 8/2012 | Lindh | H04L 5/0039 370/329 |
| 2013/0044693 A1 | 2/2013 | Lindh et al. | |
| 2013/0094442 A1 | 4/2013 | Kim et al. | |
| 2013/0201926 A1 | 8/2013 | Nam et al. | |
| 2014/0003385 A1* | 1/2014 | Dinan | H04W 16/02 370/329 |
| 2014/0153539 A1* | 6/2014 | Seo | H04L 5/0044 370/330 |

FOREIGN PATENT DOCUMENTS

| | | |
|---|---|---|
| EP | 2469744 A2 | 6/2012 |
| WO | 2010129605 A1 | 11/2010 |
| WO | 2011025195 A2 | 3/2011 |
| WO | 2011085195 A1 | 7/2011 |

OTHER PUBLICATIONS

3GPP TSG-RAN R1-113680—Search Space for Enhanced Control Channels—p. 1.*
"3rd Generation Partnership Project; Technical Specification Group Radio Access Network; Evolved Universal Terrestrial Radio Access (E-UTRA); Physical Channels and Modulation (Release 11)," 3GPP TS 36.211, V11.0.0, Technical Specification, Sep. 2012, 106 pages.
LTE, Evolved Universal Terrestrial Radio Access (E-UTRA); Physical layer procedures (3GPP TS 36.213 version 10.2.0 Release 10), Jun. 2011, 123 pages.
"3rd Generation Partnership Project; Technical Specification Group Radio Access Network; Evolved Universal Terrestrial Radio Access (E-UTRA); Physical layer procedures (Release 11)," 3GPP TS 36.213, V11.0.0, Technical Specification, Sep. 2012, 143 pages.
Ericsson, et al., "Search space for enhanced control channels," 3GPP TSG-RAN WG1 #67, R1-113680, San Francisco, Nov. 14-18, 2011, 2 pages.
"3rd Generation Partnership Project; Technical Specification Group Radio Access Network; Evolved Universal Terrestrial Radio Access (E-UTRA); Physical layer for relaying operation (Release 10)," 3GPP TS 36.216 V10.3.0 Jun. 2011, Technical Specification, Jun. 2011, 16 pages.
LG Electronics, Inc., "PDSCH Starting Symbol Indication for Cross-Carrier Scheduling," TSG-RAN WG1 Meeting #61, R1-102707, Montreal, Canada May 10-14, 2010, 4 pages.
NTT Docomo, "On RRC Signaling of PDSCH Starting Position," 3GPP TSG RAN WG1 Meeting #61bis, R1-104011, Dresden Germany, Jun. 28-Jul. 2, 2010, 2 pages.
Alcatel-Lucent Shanghai Bell and Alcatel-Lucent, "Backhaul Performance Requirement for Relay," 3GPP TSG RAN WG4 Meeting #57AH, R4-110354, Austin, Texas Jan. 17-21, 2011, 4 pages.

* cited by examiner

| SIGNAL ePDSCH STARTING SYMBOL IN PCFICH |

| SIGNAL ePDSCH STARTING SYMBOL USING RRC PARAMETER |

| SIGNAL ePDSCH STARTING SYMBOL IN COMMON SEARCH SPACE |

| SIGNAL ePDSCH STARTING SYMBOL IN PART OF GRANT |

SYSTEM AND METHOD FOR DATA CHANNEL TRANSMISSION AND RECEPTION

CROSS-REFERENCE TO RELATED APPLICATIONS

This application is a continuation of U.S. patent application Ser. No. 13/651,111, filed on Oct. 12, 2012, and entitled, "System and Method for Data Channel Transmission and Reception," which claims the benefit of U.S. Provisional Application No. 61/546,878, filed on Oct. 13, 2011, entitled "System and Method for Data Channel Transmission and Reception," which application is hereby incorporated herein by reference.

TECHNICAL FIELD

The present disclosure relates generally to digital communications, and more particularly to a system and method for data channel transmission and reception.

BACKGROUND

As the demand for data increases, communications systems should increase the efficiency in which the spectrum is utilized. Within the context of industrial and technical standards, member companies are looking at ways to improve performance. As an example, in the Third Generation Partnership Project (3GPP) Long Term Evolution (LTE) Release 10 (Rel-10), at most 13 symbols per subframe can be used for data transmission. However, for 3GPP LTE Release 11 (Rel-11), a new control channel referred to as an enhanced physical downlink control channel (ePDCCH) is being specified. For user equipment (UE), also commonly referred to as users, subscribers, terminals, mobile stations, mobiles, and the like, the use of the ePDCCH for assignments may permit more symbols to be used for data transmission than when compared to UEs receiving assignments with a physical downlink control channel (PDCCH).

SUMMARY

Example embodiments of the present disclosure which provide a system and method for data channel transmission and reception.

In accordance with an example embodiment of the present disclosure, a method includes allocating, by a communications controller, a first set of resource blocks to an enhanced physical downlink shared channel (ePDSCH), where the ePDSCH has a first starting point and allocating, by the communications controller, a second set of resource blocks to an enhanced physical downlink control channel (ePDCCH). The method also includes identifying, by the communications controller, a second starting point for the ePDSCH, where the second starting point for the ePDSCH is located within a legacy control region, where the first starting point of the ePDCCH is located within the legacy control region, and where the second starting point of the ePDSCH is different than the first starting point of the ePDCCH. Additionally, the method includes signaling, by the communications controller to a user equipment (UE) the second starting point and a number of the second set of resource blocks allocated to the ePDSCH.

In accordance with another example embodiment of the present disclosure, a method includes decoding, by a user equipment (UE), an enhanced physical downlink control channel (ePDCCH) to obtain a set of resource blocks allocated to an enhanced physical shared channel (ePDSCH), where the ePDCCH has a first starting point. The method also includes determining, by the UE, a second starting point for respective resource elements of the set of resource blocks for the ePDSCH, the second starting point of the ePDSCH located in a control region, where the first starting point of the ePDCCH is located within a legacy control region, and where the second starting point of the ePDSCH is different than the first starting point of the ePDCCH. Additionally, the method includes receiving, by the UE, the ePDSCH in accordance with the second starting point and a number of resource blocks allocated to the ePDSCH.

In accordance with another example embodiment of the present disclosure, a communications controller includes a processor and a non-transitory computer readable storage medium storing a program for execution by the processor. The programming including instructions to allocate a first set of resource blocks to an enhanced physical downlink shared channel (ePDSCH), where the ePDSCH has a first starting point and allocate a second set of resource blocks to an enhanced physical downlink control channel (ePDCCH). The programming also includes instructions to identify a second starting point for the ePDSCH, where the second starting point for the ePDSCH is located within a legacy control region, where the first starting point of the ePDCCH is located within the legacy control region, and where the second starting point of the ePDSCH is different than the first starting point of the ePDCCH. Additionally, the programming includes instructions to signal, to a user equipment (UE) the second starting point and a number of the second set of resource blocks allocated to the ePDSCH.

In accordance with another example embodiment of the present disclosure, user equipment (UE) includes a processor and a non-transitory computer readable storage medium storing a program for execution by the processor. The programming including instructions to decode an enhanced physical downlink control channel (ePDCCH) to obtain a set of resource blocks allocated to an enhanced physical shared channel (ePDSCH), where the ePDCCH has a first starting point. The programming also includes instructions to determine a second starting point for respective resource elements of the set of resource blocks for the ePDSCH, the second starting point of the ePDSCH located in a control region, where the first starting point of the ePDCCH is located within a legacy control region, and where the second starting point of the ePDSCH is different than the first starting point of the ePDCCH. Additionally, the programming includes instructions to receive the ePDSCH in accordance with the second starting point and a number of resource blocks allocated to the ePDSCH.

One advantage of an embodiment is that additional symbols per subframe may be used for data transmission, thereby increasing data rate, spectrum utilization, and efficiency.

A further advantage of an embodiment is that very little to no additional overhead is needed, thereby signaling overhead does not negatively impact data rate, spectrum utilization, and efficiency.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to data channel transmission and reception. For example, at a communications controller, the communications controller allocates a number of resource blocks to an enhanced physical downlink shared channel (ePDSCH), and identifies a starting point for the resource blocks of the ePDSCH, the starting point located within a control region of a subframe. The communications controller also signals to a user equipment (UE) the starting point of the resource blocks and the number of resource blocks allocated to the ePDSCH. As another example, at a UE, the UE decodes an enhanced physical downlink control channel to obtain a number of resource blocks allocated to an enhanced physical shared channel (ePDSCH), and determines a starting point for the ePDSCH, the starting point located in a control region of a subframe. The UE also receives the ePDSCH in accordance with the starting point and the number of resource blocks allocated to the ePDSCH.

The present disclosure will be described with respect to example embodiments in a specific context, namely a communications system that is compliant to 3GPP LTE Rel-10 and later with support for the ePDCCH. The disclosure may also be applied, however, to other standards compliant and non-standards compliant communications systems that allow non-control data to be transmitted in a control portion of a subframe.

Figure 1:
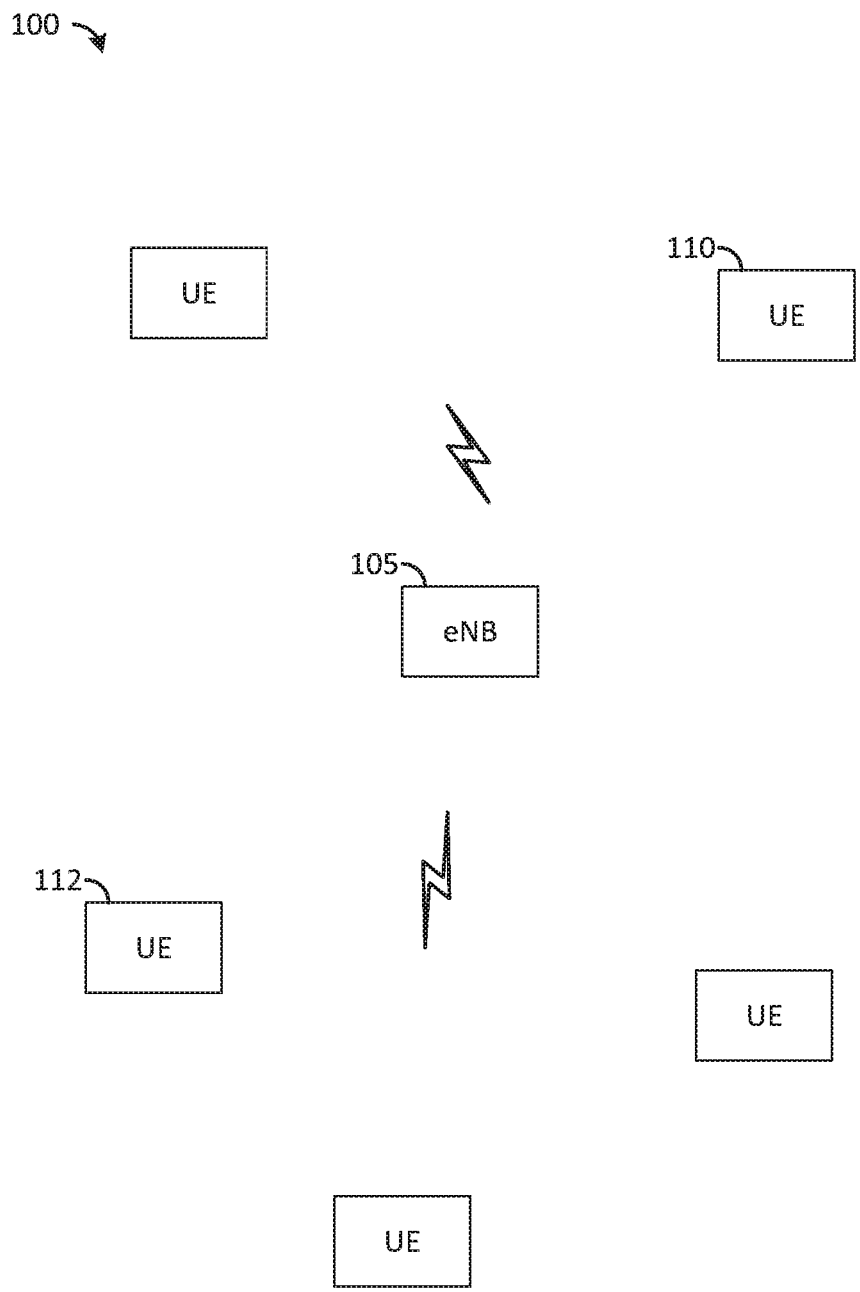
FIG. 1 illustrates an example communications system according to example embodiments described herein.

FIG. 1 illustrates a communications system 100. Communications system 100 includes an evolved Node B (eNB) 105 serving a plurality of UEs, such as UE 110 and UE 112. eNBs may also be commonly referred to as base stations, NodeB, communications controllers, controllers, base transceiver stations, access points, and the like.

eNB 105 controls communications to and from the UEs that it serves by scheduling resource grants to the UEs individually. As an example, eNB 105 may grant one or more resources to UE 110 for use in a downlink transmission, inform UE 110 of the granted resources, and then transmit data to UE 110. Similarly, eNB 105 may grant one or more resources to UE 112 for use in an uplink transmission, inform UE 112 of the granted resources, and then expect to receive an uplink transmission from UE 112 in the granted resources. The resources may be time resources, frequency resources, or a combination of time-frequency resources.

While it is understood that communications systems may employ multiple eNBs capable of communicating with a number of UEs, only one eNB, and five UEs are illustrated for simplicity.

Figure 2:
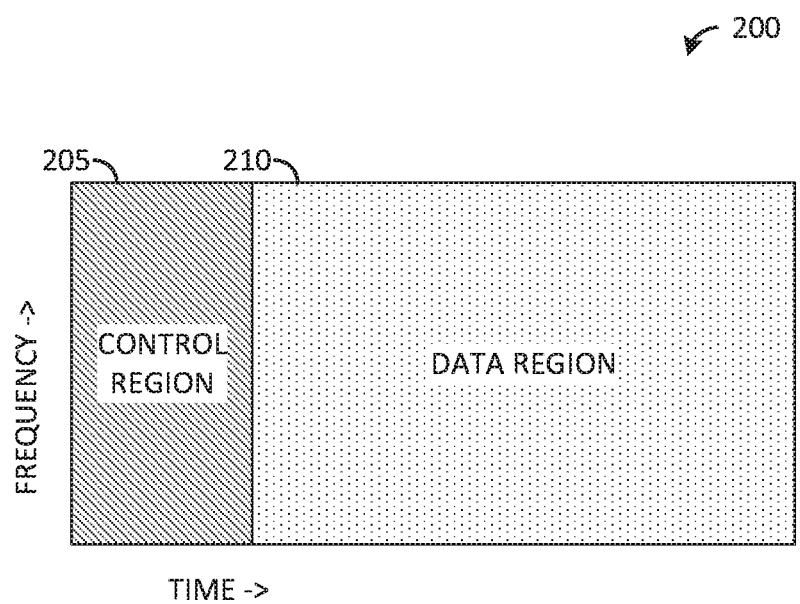
FIG. 2 illustrates an example structure of a subframe of a 3GPP LTE compliant communications system according to example embodiments described herein.

FIG. 2 illustrates a structure of a subframe 200 of a 3GPP LTE compliant communications system. Subframe 200 includes a control region 205 and a data region 210. Generally, control region 205 is used to communicate control information and data region 210 is used to communicate data. A control region may also be referred to as a control domain, while a data region may also be referred to as a data domain. A PDCCH is located in control region 205, usually in the first several symbols (e.g., one to four symbols) of subframe 200. A physical downlink shared channel (PDSCH) is located in data region 210 and is used to transmit data to UEs.

Other control channels, such as a physical hybrid indicator channel (PHICH), which is used to transmit acknowledgements/negative acknowledgements (ACK/NACK) in response to uplink data transmissions, physical control format indicator channel (PCFICH), which is used to indicate a number of symbols of control region 205 of subframe 200, for example, are located in control region 205. The PDDCH, PHICH, and the PCFICH are all located in control region 205.

Control region 205 comprises one or more control channel elements (CCEs). There is a mapping procedure for assigning the resource elements that comprise each CCE to both a time location and a frequency location within control region 205. A CCE may be use noncontiguous resources to exploit frequency diversity. A particular PDCCH may occupy 1, 2, 4, or 8 consecutive CCEs. A UE uses search space rules to identify possible CCEs that contain resource assignments (i.e., a PDCCH) for it. The search space rules may have provisions for a common search space.

In 3GPP LTE Rel-11, there is a proposal for another control channel to, amongst other things, assign resource grants to 3GPP LTE Rel-11 compliant UEs. The new control channel is referred to as an ePDCCH and is intended to be at least frequency-domain multiplexed (FDM) with an LTE subframe. Furthermore, the ePDCCH may also be time-domain multiplexed (TDM) or code-domain multiplexed (CDM) with other channels such as data channels. For simplicity, and without loss of generality, the discussion presented herein is made using FDM. It is noted that adding TDM and/or CDM components is straightforward.

Figure 3:
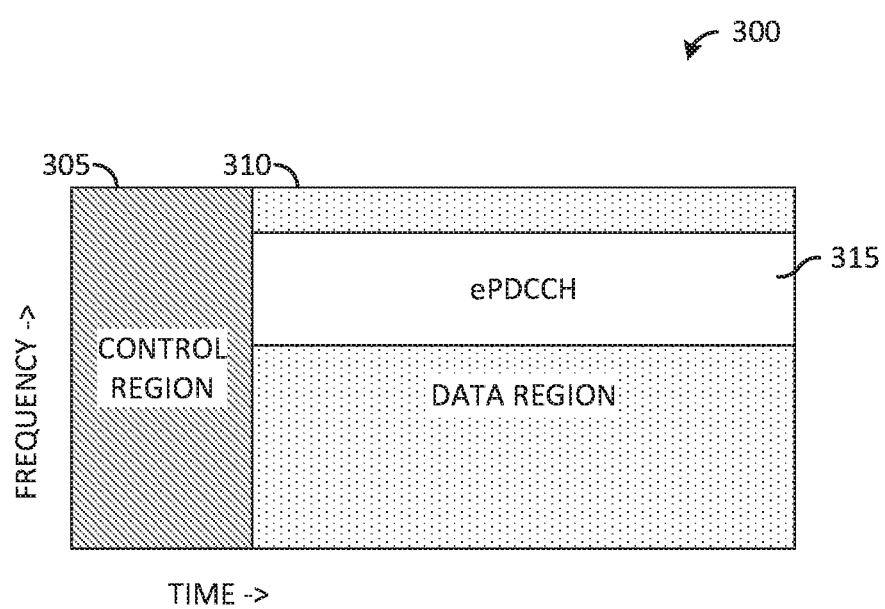
FIG. 3 illustrates an example structure of a first subframe of a 3GPP LTE compliant communications system highlighting an ePDCCH according to example embodiments described herein.
Figure 4:
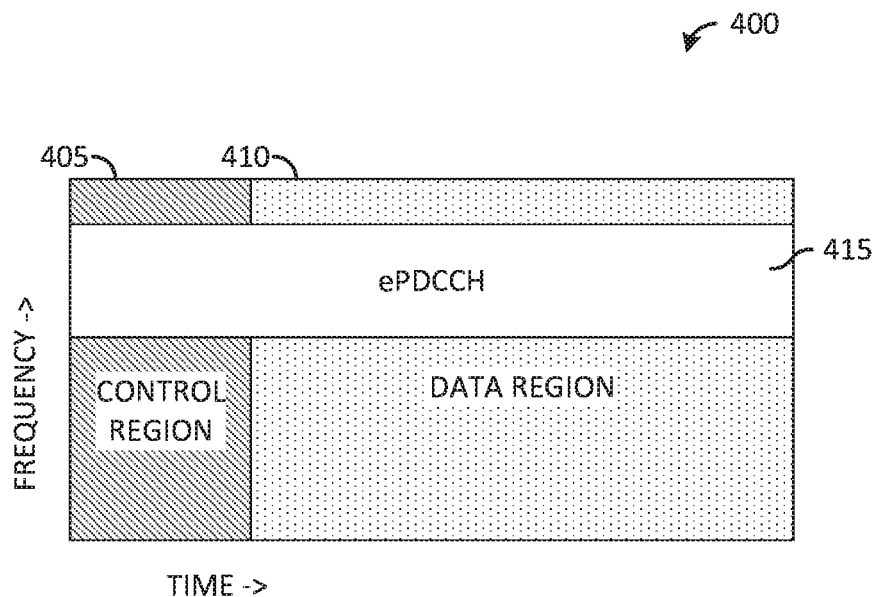
FIG. 4 illustrates an example structure of a second subframe of a 3GPP LTE compliant communications system highlighting an ePDCCH according to example embodiments described herein.

FIG. 3 illustrates a structure of a first subframe 300 of a 3GPP LTE compliant communications system highlighting an ePDCCH. As shown in FIG. 3, subframe 300 includes a control region 305 and a data region 310. An ePDCCH 315 is located in data region 310. FIG. 4 illustrates a structure of a second subframe 400 of a 3GPP LTE compliant communications system highlighting an ePDCCH. As shown in FIG. 4, subframe 400 includes a control region 405 and a data region 410. An ePDCCH 415 is located in control region 405 and data region 410. It is noted that the representations of subframes 300 and 400 shown in FIGS. 3 and 4 are logical domain representations and that the ePDCCHs may occupy non-contiguous frequency resources.

There may be several scenarios where it may be desirable for the ePDCCH to occupy both a control region and a data region. In a first scenario, multiple remote radio heads (RRH) may be used with the same cell identifier, cell ID. In such a case, several RRHs transmit in the same cell. One of the RRH (e.g., a macro-cell) may transmit a PDCCH, and another RRH (e.g., a pico-cell) may transmit an ePDCCH. If the UE for which the ePDCCH is intended is far from the RRH transmitting the PDCCH, the ePDCCH may start in the control region (e.g., at symbol #0). The UE may then be able to decode it, as long as the interference created by the PDCCH is sufficiently low.

In a second scenario, there may be no PDCCH transmission. If the eNB does not transmit any PDCCH (for instance, if there is no rel-10 or earlier UE scheduled), then the control region may only contain the PCFICH, the PHICH, and reference signals. In such a case, the control region may be sparsely occupied, and it may be possible to start the ePDCCH transmission for rel-11 UEs in the control region (e.g., at symbol #0). It is noted that there may be other scenarios where it may be desirable to have the ePDCCH occupy both a control region and a data region, such as when there are few CCEs occupied by a PDCCH transmission in the control region, and the like.

It may be advantageous for compatible UEs to start PDSCH transmission in a control region as well. As an example, when there is no PDCCH transmission in the control region, there is plenty of resource blocks (RBs) with no resource elements used for transmitting the control channel. It is noted that RBs are the basic resource unit of 3GPP LTE. A RB comprises a plurality of resource elements (a symbol-subcarrier unit) and may be allocated to carry information and/or data. With RBs with no resource elements used for transmitting the control channel, the PDSCH transmission may start in the control region. In the discussion presented below, a PDSCH that starts in the control region is referred to as an ePDSCH to help prevent confusion. The terminology PDSCH will be used for Rel-10 compliant PDSCH only.

Figure 5:
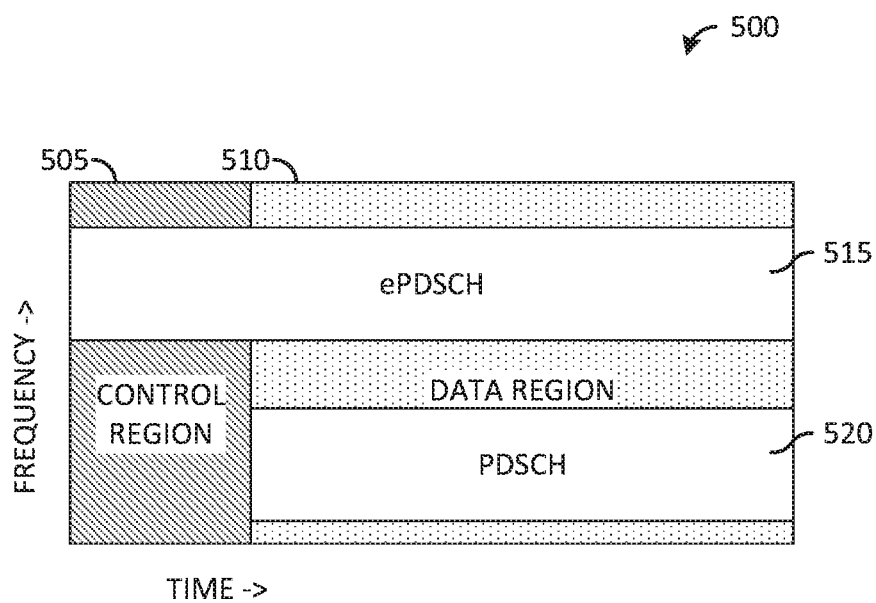
FIG. 5 illustrates an example structure of a subframe of a 3GPP LTE compliant communications system highlighting an ePDSCH and a PDSCH according to example embodiments described herein.

FIG. 5 illustrates a structure of a subframe 500 of a 3GPP LTE compliant communications system highlighting an ePDSCH and a PDSCH. Subframe 500 includes a control region 505 and a data region 510. As shown in FIG. 5, subframe 500 includes an ePDSCH 515 that is located in both control region 505 and data region 510 and a PDSCH 520 that is located only in data region 510. ePDSCH 515 may start at a variety of symbols in control region 505, e.g., symbol 0, 1, 2, or 3. However, in FIG. 5, ePDSCH 515 is shown as starting at symbol 0 to maximize data content.

A starting point of PDSCH 520 may be indicated by an indicator in the PCFICH that specifies a number of symbols occupied by control region 505. PDSCH 520 (and data region 510) may then start at the next symbol. As an example, if control region 505 occupies 2 symbols (symbols 0, and 1), then PDSCH 520 may start at the 3rd symbol, symbol 2.

According to an example embodiment, a starting symbol (or starting point) of an ePDSCH may differ. As an example, the starting symbol for ePDSCHs may be the same for all UEs. As another example, the starting symbol for ePDSCHs may be UE dependent, differing for different UEs. An ePDSCH with a varying starting symbol may allow for avoidance of interference from control channels, such as PDCCH, from other cells. Since the level of interference varies with UE location, the starting point of an ePDSCH may differ between different UEs, depending on the level of interference seen from control channels of neighboring cells.

In a situation when the starting point of ePDSCHs is the same for all UEs, there are several techniques that may be used to indicate to the UEs the starting point. A first technique sets the starting point at a particular symbol, such as symbol 0. Fixing the starting point eliminates the need for signaling the starting point, therefore ensuring maximum resource utilization. However, no flexibility is provided to combat interference from control channels from neighboring cells.

A second technique uses an indicator in the PCFICH to indicate the starting point of the ePDSCH. In 3GPP LTE Rel-10, there are three possible values for the number of symbols occupied by the control region: 1, 2, 3 or 2, 3, 4 depending on bandwidth. Three possible values require the use of a two-bit indicator, which provides for up to four possible values. Therefore, one value is unused. The fourth value may then be used to indicate the starting point of the ePDSCH. As an example, the presence of the fourth value indicates that the starting point of the ePDSCH is at symbol 0.

As an illustrative example, when the bits of the indicator in the PCFICH are remapped, the following rule may be used to remap the 4 possible values, since only 3 of the 4 are needed (1, 2, 3 when the bandwidth is greater than 10 RBs, 2, 3, 4 when the bandwidth is smaller than or equal to 10 RBs):

1) 1, 2, 3, 4 to 1, 2, 3, 0, respectively, when bandwidth is greater than 10 RBs; and
2) 1, 2, 3, 4 to 0, 2, 3, 4, respectively, when bandwidth is smaller or equal to 10 RBs.

An example of mapping function for 1) is f=(indicator) modulo 4. An example of mapping function for 2) is f=floor((5*indicator-2)/4). Therefore, if the UE receives the indicator and it is equal to 0, then the UE knows that the starting point of the ePDSCH is at symbol 0.

A third technique uses a radio resource control (RRC) parameter, e.g., pdsch-start, to indicate the starting point of the ePDSCH. In 3GPP LTE Rehm, an RRC parameter, e.g., pdsch-start, is used to indicate the number of symbols occupied by the control region: 1, 2, 3 or 2, 3, 4 depending on bandwidth. The three possible values require the use of a two-bit RRC parameter, which provides for up to four possible values. Therefore, one value is unused. The fourth value may then be used to indicate the starting point of the ePDSCH. As an example, the presence of the fourth value indicates that the starting point of the ePDSCH is at symbol 0.

As an illustrative example, when the bits of the RRC parameter are remapped, the following rule may be used to remap the 4 possible values, since only 3 of the 4 are needed (1, 2, 3 when the bandwidth is greater than 10 RBs, 2, 3, 4 when the bandwidth is smaller than or equal to 10 RBs):
  i) 1, 2, 3, 4 to 1, 2, 3, 0, respectively, when bandwidth is greater than 10 RBs; and
  ii) 1, 2, 3, 4 to 0, 2, 3, 4, respectively, when bandwidth is smaller or equal to 10 RBs.

An example of mapping function for i) is f=(pdsch-start) modulo 4. An example of mapping function for ii) is f=floor((5*pdsch-start-2)/4). Therefore, if the UE receives the RRC parameter and it is equal to zero, then the UE knows that the starting point of the ePDSCH is at symbol 0.

A fourth technique places an indicator of the starting point of the ePDSCH in a common search space of a control channel, e.g., a PDCCH or an ePDCCH. In general, a search space comprises a group of resources that a UE searches to find a control channel, e.g., a PDCCH or an ePDCCH, intended for it. The indicator of the starting point of the ePDSCH may also be located in the search space of the control channel so that the UE will find the indicator as it searches for the control channel. It is noted that the indicator may be a multi-bit value to indicate multiple possible starting points for the ePDSCH.

In a situation when the starting point of ePDSCHs are UE specific, there are several techniques that may be used to indicate the starting point of the ePDSCHs to the UEs. A first technique uses an indicator that is part of a resource grant to the UE. As an example, the indicator of the starting point of ePDSCHs for a particular UE is included in a resource grant sent to the UE. The use of a resource grant may require the use of a new field in the DCI format to indicate the starting symbol of the ePDSCH. As an example, a two-bit field coded similarly as the pdsch-start RRC parameter discussed above may be used.

A second technique uses a radio resource control (RRC) parameter, e.g., pdsch-start, to indicate the starting point of the ePDSCH. In 3GPP LTE Rel-10, an RRC parameter, e.g., pdsch-start, is used to indicate the number of symbols occupied by the control region: 1, 2, 3 or 2, 3, 4 depending on bandwidth. The three possible values require the use of a two-bit RRC parameter, which provides for up to four possible values. Therefore, one value is unused. The fourth value may then be used to indicate the starting point of the ePDSCH. As an example, the presence of the fourth value indicates that the starting point of the ePDSCH is at symbol 0. The illustrative example of the use of the RRC parameter for the case with the same starting point for all UEs also applies to this technique.

A third technique places an indicator of the starting point of the ePDSCH in a common search space of a control channel, e.g., a PDCCH or an ePDCCH. In general, a search space comprises a group of resources that a UE searches to find a control channel, e.g., a PDCCH or an ePDCCH, intended for it. The indicator of the starting point of the ePDSCH may also be located in the search space of the control channel so that the UE will find the indicator as it searches for the control channel. It is noted that the indicator may be a multi-bit value to indicate multiple possible starting points for the ePDSCH.

Figures 6A, 6B, 6C, 6D, 6E:
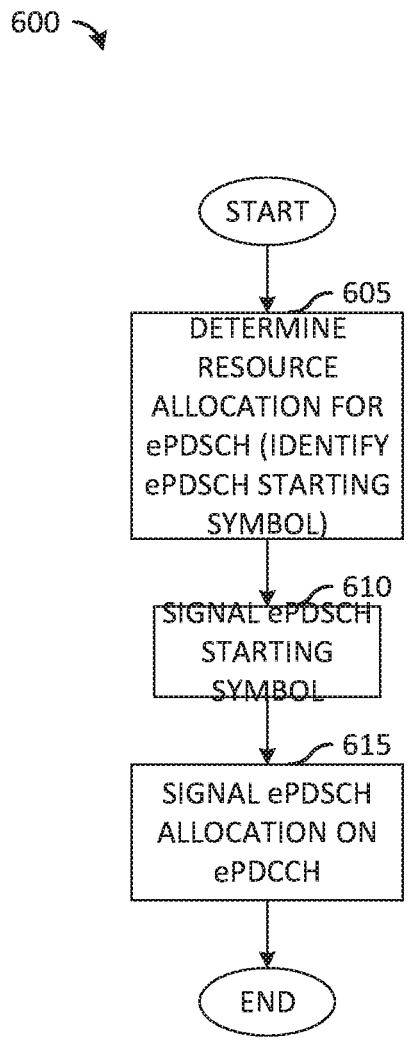
FIG. 6a illustrates an example flow diagram of eNB operations in transmitting an ePDSCH according to example embodiments described herein.
FIGS. 6b, 6c, 6d, and 6e illustrate example starting point signaling according to example embodiments described herein.

FIG. 6a illustrates a flow diagram of eNB operations 600 in transmitting an ePDSCH. eNB operations 600 may be indicative of operations occurring in an eNB, such as eNB 105, as the eNB transmits an ePDSCH to a UE, such as UE 110 and UE 112.

eNB operations 600 may begin with the eNB determining a resource allocation for the ePDSCH that it is transmitting to the UE (block 605). The resource allocation may include which RBs are to be occupied by the ePDSCH and a starting point (e.g., a starting symbol) for the ePDSCH. The resource allocation may also include other information, such as ePDSCH ending point (e.g., an ending symbol), ePDSCH resource element (RE) and/or antenna port mapping, and the like. In general, the starting point of an ePDSCH lies within a control region of a subframe.

The eNB may signal the starting point (e.g., the starting symbol) for the ePDSCH (block 610). As discussed previously, the eNB may use an unused state of an indicator in the PCFICH to indicate the starting point for the ePDSCH (shown as block 650 of FIG. 6b). Also discussed previously, the eNB may use an unused state of a RRC parameter to indicate the starting point of the ePDSCH (shown as block 655 of FIG. 6c). Also discussed previously, the eNB may use an indicator located in a common search space of a control channel, such as a PDCCH or ePDCCH, to indicate the starting point of the ePDSCH (shown as block 660 of FIG. 6d). Also discussed previously, the eNB may use an indicator that is part of a resource grant for the ePDSCH sent to the UE to indicate the starting point of the ePDSCH (shown as block 665 of FIG. 6e). It is noted that if the starting point of the ePDSCH is always fixed, e.g., at symbol 0, then the eNB may not need to signal the starting point for the ePDSCH.

It is noted that the signaling of the starting point of the ePDSCH need not occur for each ePDSCH. As an example, if the RRC parameter is used, a previously received ePDSCH starting point may be assumed to be valid until a new RRC parameter is received.

Referencing back to FIG. 6a, the eNB may signal the ePDSCH allocation, e.g., the RBs to be occupied by the ePDSCH, ePDSCH ending point, ePDSCH RE and/or antenna port mapping, and the like, to the UE (block 615). The ePDSCH allocation may be signaled on an ePDCCH that corresponds to the ePDSCH. Existing, modified, or new downlink control indicator (DCI) format(s) may be used. It is noted that the signaling of the ePDSCH starting point and the ePDSCH allocation may be transmitted in a single message, such as in a message with a modified or new DCI format.

Figure 7A:
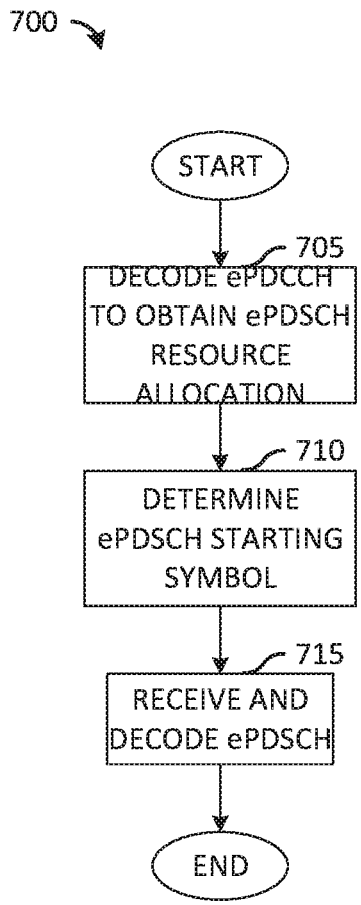
FIG. 7a illustrates an example flow diagram of UE operations in receiving an ePDSCH according to example embodiments described herein.

FIG. 7a illustrates a flow diagram of UE operations 700 in receiving an ePDSCH. UE operations 700 may be indicative of operations occurring in a UE, such as UE 110 and UE 112, as the UE receives an ePDSCH from an eNB, such as eNB 105.

UE operations 700 may begin with the UE decoding an ePDCCH to obtain its ePDSCH allocation (block 705). The ePDSCH allocation may include which RBs are to be occupied by the ePDSCH. The resource allocation may also include other information, such as ePDSCH ending point (e.g., an ending symbol), ePDSCH range extension (RE) and/or antenna port mapping, and the like.

Figure 7B:
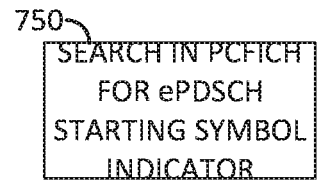
FIGS. 7b, 7c, 7d, and 7e illustrate example starting point determining according to example embodiments described herein.
Figure 7C:
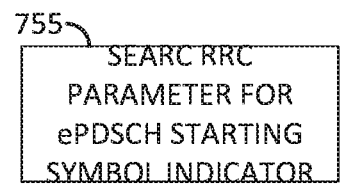
Figure 7D:
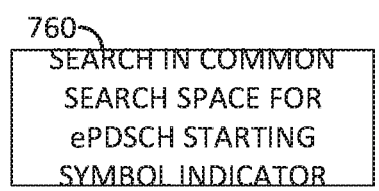
Figure 7E:
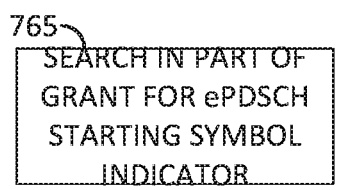

The UE may determine a starting point (e.g., a starting symbol) of the ePDSCH (block 710). In general, the starting point of an ePDSCH lies within a control region of a subframe. As discussed previously, an unused state of an indicator in the PCFICH may be used to indicate the starting point for the ePDSCH, so the UE may search in the PCFICH to find the indicator and determine the starting point (shown as block 750 of FIG. 7b). Also discussed previously, an unused state of a RRC parameter may be used to indicate the starting point of the ePDSCH, so the UE may search for the RRC parameter to determine the starting point (shown as block 755 of FIG. 7c). Also discussed previously, an indicator located in a common search space of a control channel, such as a PDCCH or ePDCCH, may be used to indicate the starting point of the ePDSCH, so the UE may search in the common search space of either the PDCCH or the ePDCCH to determine the starting point (shown as block 760 of FIG. 7d). Also discussed previously, an indicator that is part of a resource grant for the ePDSCH sent to the UE may be used to indicate the starting point of the ePDSCH, so the UE may search in the resource grant for the indicator to determine the starting point (shown as block 765 of FIG. 7e). It is noted that if the starting point of the ePDSCH is always fixed, e.g., at symbol 0, then the UE may not need to determine the starting point for the ePDSCH.

It is noted that the signaling of the starting point of the ePDSCH need not occur for each ePDSCH. If the UE does not find a new indicator of the starting point of the ePDSCH, it may assume that a previously received ePDSCH starting point and use that starting point until it receives a new indicator of the starting point of the ePDSCH. It is also noted that the signaling of the ePDSCH starting point and the ePDSCH allocation may be received in a single message, such as in a message with a modified or new DCI format.

Referencing back now to FIG. 7a, the UE may receive and decode the ePDSCH using the starting point and the ePDSCH allocation (block 715).

Since the control region may not be fully unoccupied, a situation may arise where some REs may be allocated to multiple channels, such as to both an ePDSCH and the PCFICH. In such a situation, the REs used by the PCFICH (or any other channel, such as the PHICH and the like) are not considered as being occupied by the ePDSCH. The UE may not assume that the REs where the PCFICH is present are used by the ePDSCH, and the eNB may not transmit any bits conveyed on the ePDSCH on a RE occupied by the PCFICH. It is noted that there is no ambiguity for the UE since the UE knows where the PCFICH (or any other channel, such as the PHICH and the like) is located. It is also noted that if an ePDCCH is mapped onto resources where a PCFICH or PHICH is presented, similar rules may apply.

Figure 8:
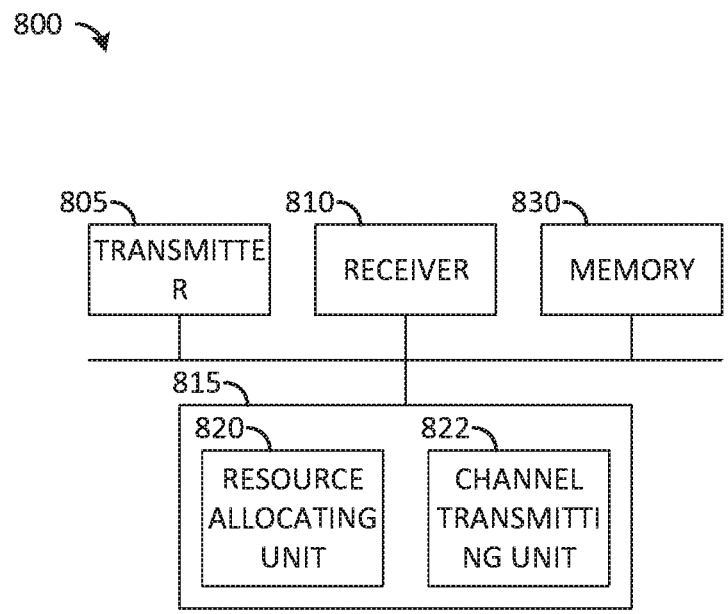
FIG. 8 illustrates an example diagram of a first communications device according to example embodiments described herein.

FIG. 8 illustrates a diagram of a first communications device 800. Communications device 800 may be an implementation of a communications controller, such as a eNB, of a communications system. Communications device 800 may be used to implement various ones of the embodiments discussed herein. As shown in FIG. 8, a transmitter 805 is configured to send control channels, indicators, messages, and the like, and a receiver 810 is configured to receive messages, and the like. Transmitter 805 and receiver 810 may have a wireless interface, a wireline interface, or a combination thereof.

A resource allocating unit 820 is configured to allocate resources for a control channel, such as an ePDSCH. Resource allocating unit 820 may allocate which RBs are to be occupied by the control channel and a starting point (e.g., a starting symbol) for the control channel. The resource allocation may also include other information, such as control channel ending point (e.g., an ending symbol), control channel resource element (RE) and/or antenna port mapping, and the like. A channel transmitting unit 822 is configured to transmit (or signal) information, such as resource allocation information about the control channel. Channel transmitting unit 822 may transmit the resource allocation using a single message or multiple messages. As an example, channel transmitting unit 822 may separately transmit the starting point of the control channel and the remainder of the resource allocation. As another example, channel transmitting unit 822 may transmit the starting point of the control channel and the remainder of the resource allocation in a single message. A memory 830 is configured to store control channels, resource allocations for the control channels, messages, and the like.

The elements of communications device 800 may be implemented as specific hardware logic blocks. In an alternative, the elements of communications device 800 may be implemented as software executing in a processor, controller, application specific integrated circuit, or so on. In yet another alternative, the elements of communications device 800 may be implemented as a combination of software and/or hardware.

As an example, transmitter 805 and receiver 810 may be implemented as a specific hardware block, while resource allocating unit 820 and channel transmitting unit 822 may be software modules executing in a processor 815, such as a microprocessor, a digital signal processor, a custom circuit, or a custom compiled logic array of a field programmable logic array. Additionally, resource allocating unit 820 and channel transmitting unit 822 may be stored in memory 830.

Figure 9:
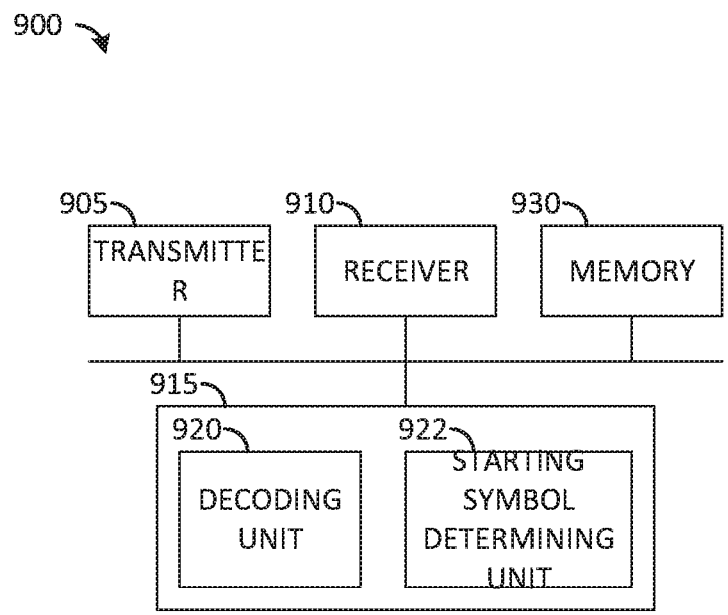
FIG. 9 illustrates an example diagram of a second communications device according to example embodiments described herein.

FIG. 9 illustrates a diagram of a second communications device 900. Communications device 900 may be an implementation of a communications device, such as a UE, of a communications system. Communications device 900 may be used to implement various ones of the embodiments discussed herein. As shown in FIG. 9, a transmitter 905 is configured to send messages, and the like, and a receiver 910 is configured to receive control channels, indicators, messages, and the like. Transmitter 905 and receiver 910 may have a wireless interface, a wireline interface, or a combination thereof.

A decoding unit 920 is configured to decode a transmission. Decoding unit 920 decodes information located in resources associated with the transmission in accordance with a known modulation and coding scheme. As an example, decoding unit 920 decodes information located in resources associated with an ePDCCH to obtain a resource allocation for an ePDSCH. A starting symbol determining unit 922 is configured to determine a starting point, e.g., a starting symbol, of a control channel, such as an ePDSCH. Depending on a signaling technique used by a communications controller serving communications device 900, starting symbol determining unit 922 may determine the starting point of the control channel by searching in a PCFICH for an indicator of the starting point, searching for an RRC parameter for an indicator of the starting point, searching in a common search space of a control channel (such as a PDCCH or an ePDCCH) for an indicator of the starting point, searching in a resource grant of the ePDSCH for an indicator of the starting point, and the like. A memory 930 is configured to store control channels, resource allocations for the control channels, starting points, messages, and the like.

The elements of communications device 900 may be implemented as specific hardware logic blocks. In an alternative, the elements of communications device 900 may be implemented as software executing in a processor, controller, application specific integrated circuit, or so on. In yet another alternative, the elements of communications device 900 may be implemented as a combination of software and/or hardware.

As an example, transmitter 905 and receiver 910 may be implemented as a specific hardware block, while decoding unit 920 and starting symbol determining unit 922 may be software modules executing in a processor 915, such as a microprocessor, a digital signal processor, a custom circuit, or a custom compiled logic array of a field programmable logic array. Additionally, decoding unit 920 and starting symbol determining unit 922 may be stored in memory 930.

Although the present disclosure and its advantages have been described in detail, it should be understood that various changes, substitutions and alterations can be made herein without departing from the spirit and scope of the disclosure as defined by the appended claims.

What is claimed is:

1. A method comprising:
receiving, by a user equipment (UE), a sub-frame carrying a physical downlink control channel (PDCCH), an enhanced physical downlink control channel (ePDCCH), and an enhanced physical shared channel (ePDSCH), the ePDCCH carrying resource allocation information for the ePDSCH, the ePDCCH spanning different frequency resources than the ePDSCH, a first frequency range spanning between a lowest frequency and a highest frequency of frequency resources of the ePDSCH, a second frequency range spanning between a lowest frequency and a highest frequency of frequency resources of the PDCCH, the second frequency range enclosing the first frequency range such that the lowest frequency of the ePDSCH is no lower than the lowest frequency of the PDCCH and such that the highest frequency of the ePDSCH is no higher than the highest frequency of the PDCCH, wherein at least some symbols of the ePDCCH overlap with at least some symbols of the ePDSCH in a time domain such that the at least some symbols of the ePDCCH span the same time domain resources as the at least some symbols of the ePDSCH, and wherein a starting symbol location of the ePDCCH is different than a starting symbol location of the ePDSCH;
receiving, by the UE, an indicator or a parameter from a communications controller; and
determining, by the UE, the starting symbol location of the ePDSCH in accordance with the indicator or the parameter.

2. The method of claim 1, wherein the indicator or the parameter includes a physical control format indicator.

3. The method of claim 1, wherein the indicator or the parameter includes a radio resource control parameter received via a radio resource control (RRC) message.

4. The method of claim 1, further comprising searching for the indicator or the parameter in a common search space of a control channel.

5. The method of claim 1, wherein the indicator or the parameter is received via a grant for the ePDSCH.

6. The method of claim 1, further comprising decoding the ePDSCH in accordance with the starting symbol location of the ePDSCH and a number of resource blocks allocated to the ePDSCH.

7. The method of claim 1, wherein the ePDSCH is scheduled by the ePDCCH.

8. The method of claim 1, wherein the ePDCCH and the ePDSCH are code-domain multiplexed, wherein the highest frequency of the PDCCH is above a highest frequency of all the ePDCCH carried in the sub-frame, and wherein the ePDSCH and the PDCCH at least partially overlap in the time domain.

9. A user equipment (UE) comprising:
at least one processor; and
a non-transitory computer readable storage medium storing programming for execution by the at least one processor, the programming including instructions to cause the UE to:
receive a sub-frame carrying a physical downlink control channel (PDCCH), an enhanced physical downlink control channel (ePDCCH), and an enhanced physical shared channel (ePDSCH), the ePDCCH carrying resource allocation information for the ePDSCH, the ePDCCH spanning different frequency resources than the ePDSCH, a first frequency range spanning between a lowest frequency and a highest frequency of frequency resources of the ePDSCH, a second frequency range spanning between a lowest frequency and a highest frequency of frequency resources of the PDCCH, the second frequency range enclosing the first frequency range such that the lowest frequency of the ePDSCH is no lower than the lowest frequency of the PDCCH and such that the highest frequency of the ePDSCH is no higher than the highest frequency of the PDCCH, wherein at least some symbols of the ePDCCH overlap with at least some symbols of the ePDSCH in a time domain such that the at least some symbols of the ePDCCH span the same time domain resources as the at least some symbols of the ePDSCH, and wherein a starting symbol location of the ePDCCH is different than a starting symbol location of the ePDSCH;
receive an indicator or a parameter from a communications controller; and
determine the starting symbol location of the ePDSCH in accordance with the indicator or the parameter.

10. The UE of claim 9, wherein the indicator or the parameter includes a physical control format indicator.

11. The UE of claim 9, wherein the indicator or the parameter includes a radio resource control parameter received via a radio resource control (RRC) message.

12. The UE of claim 9, wherein the programming further includes instructions to search for the indicator or the parameter in a common search space of a control channel.

13. The UE of claim 9, wherein the indicator or the parameter is received via a grant for the ePDSCH.

14. The UE of claim 9, wherein the programming further includes instructions to decode the ePDSCH in accordance with the starting symbol location of the ePDSCH and a number of resource blocks allocated to the ePDSCH.

15. The UE of claim 9, wherein the ePDSCH is scheduled by the ePDCCH.

16. A method comprising:
transmitting, by a communications controller, a sub-frame carrying a physical downlink control channel (PDCCH), an enhanced physical downlink control channel (ePDCCH), and an enhanced physical shared channel (ePDSCH) to a user equipment (UE), the ePDCCH carrying resource allocation information for the ePDSCH, the ePDCCH spanning different frequency resources than the ePDSCH, a first frequency range spanning between a lowest frequency and a highest frequency of frequency resources of the ePDSCH, a second frequency range spanning between a lowest frequency and a highest frequency of frequency resources of the PDCCH, the second frequency range enclosing the first frequency range such that the lowest frequency of the ePDSCH is no lower than the lowest frequency of the PDCCH and such that the highest frequency of the ePDSCH is no higher than the highest frequency of the PDCCH, wherein at least some symbols of the ePDCCH overlap with at least some symbols of the ePDSCH in a time domain, and wherein a starting symbol location of the ePDCCH is different than a starting symbol location of the ePDSCH; and transmitting, by the communications controller, an indicator or a parameter to the UE, the indicator or the parameter including information for locating the starting symbol location of the ePDSCH.

17. The method of claim 16, wherein the indicator or the parameter includes a physical control format indicator.

18. The method of claim 16, wherein the indicator or the parameter includes a radio resource control parameter received via a radio resource control (RRC) message.

19. A communications controller comprising:
at least one processor; and
a non-transitory computer readable storage medium storing programming for execution by the at least one processor, the programming including instructions to cause the communications controller to:
transmit a sub-frame carrying a physical downlink control channel (PDCCH), an enhanced physical downlink control channel (ePDCCH), and an enhanced physical shared channel (ePDSCH) to a user equipment (UE), the ePDCCH carrying resource allocation information for the ePDSCH, the ePDCCH spanning different frequency resources than the ePDSCH, a first frequency range spanning between a lowest frequency and a highest frequency of frequency resources of the ePDSCH, a second frequency range spanning between a lowest frequency and a highest frequency of frequency resources of the PDCCH, the second frequency range enclosing the first frequency range such that the lowest frequency of the ePDSCH is no lower than the lowest frequency of the PDCCH and such that the highest frequency of the ePDSCH is no higher than the highest frequency of the PDCCH, wherein at least some symbols of the ePDCCH overlap with at least some symbols of the ePDSCH in a time domain, and wherein a starting symbol location of the ePDCCH is different than a starting symbol location of the ePDSCH; and
transmit an indicator or a parameter to the UE, the indicator or the parameter including information for locating the starting symbol location of the ePDSCH.

20. The communications controller of claim 19, wherein the indicator or the parameter includes a physical control format indicator.

21. The communications controller of claim 19, wherein the indicator or the parameter includes a radio resource control parameter received via a radio resource control (RRC) message.

* * * * *